2,990,265
METHOD OF DESTROYING VEGETATION WITH XANTHATES

Philip C. Hamm, Webster Groves, Mo., and Kenneth L. Godfrey, St. Albans, W. Va., assignors to Monsanto Chemical Company, St. Louis, Mo., a corporation of Delaware
No Drawing. Filed Dec. 23, 1957, Ser. No. 704,251
9 Claims. (Cl. 71—2.3)

This invention relates to a method of destroying vegetation and to herbicidal compositions. More particularly, it relates to a method of destroying vegetation which comprises applying a lethal concentration of a halogen substituted aralkyl ester of a xanthic acid. These agents are effective against broadleaf plants and grasses.

The halogen substituted aralkyl esters of xanthic acids exert a hormone like action in either contact or pre-emergence application. Accordingly, by applying the toxicant to the plant is meant any means whereby the toxicant is brought into contact with living plants which latter include germinating seedlings, as for example by application to the ground before the plants emerge or by direct application to the foliage. Although the killing effect is especially severe against broadleaves, they exert a general lethal action. An object of the invention is to provide compositions for destruction of noxious vegetation. A particular object of the invention is to provide herbicidal compositions which are effective against broadleaf plants. Further objects will be apparent from the detailed description following.

The herbicides of this invention may be represented by the general formula

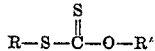

$$R-S-\overset{\overset{S}{\|}}{C}-O-R'$$

where R is a halogen substituted aralkyl radical and R' is an acyclic radical, preferably a lower alkyl or alkenyl radical as for example, allyl. Halogen in the aryl nucleus of the aralkyl radical is essential, three being preferred. Examples of the toxicants comprise o-chlorobenzyl ethylxanthate, m-chlorobenzyl methylxanthate, 2,3-dichlorobenzyl propylxanthate, 2,4-dichlorobenzyl ethylxanthate, 2,6 - dichlorobenzyl butylxanthate, 2,6 - dibromobenzyl ethylxanthate, 3,4-dichlorobenzyl ethylxanthate, 3,5-dichlorobenzyl ethylxanthate, 2,4,5-trichlorobenzyl ethylxanthate, 2,4,6-trichlorobenzyl ethylxanthate, 2,3,6-trichlorobenzyl ethylxanthate, 2,3,6-tribromobenzyl ethylxanthate, 3,4,5-trichlorobenzyl ethylxanthate, 2,3,4-trichlorobenzyl ethylxanthate, 2,3,5-trichlorobenzyl ethylxanthat, 2,3,4,6-tetrachlorobenzyl ethylxanthate, 2,3,4,5-tetrachlorobenzyl ethylxanthate, 2,3,5,6-tetrachlorobenzyl ethylxanthate, α-methyl-2,6-dichlorobenzyl ethylxanthate, 2,6-diiodobenzyl ethylxanthate and α-methyl-2,3,6-trichlorobenzyl ethylxanthate.

The new toxicants may be applied conveniently in the form of a spray containing the active ingredient in a concentration within the range of 0.1%–10.0% by weight. Thorough coverage of the foliage is effective for contact killing. For pre-emergence use amounts within the range of 1–60 pounds per acre may be used. Although the toxicants are insoluble in water, they are soluble in common organic solvents. They may be dispersed directly in water or a solution in organic solvent may be dispersed in aqueous medium with or without the aid of a surface active agent. Emulsions may be prepared from solution in water immiscible solvents. As dispersing and wetting agents there may be employed soft or hard sodium or potassium soaps, alkylated aromatic sodium sulfonates such as sodium dodecyl benzene sulfonate, or an amine salt thereof, alkali metal salts of sulfated fatty alcohols, ethylene oxide condensation products of alkyl phenols, tall oil, higher alcohols or higher mercaptans.

While some of the toxicants are new compounds, others have been described. In general the toxicants may be prepared by condensing a halogenated aralkyl halide with a metal salt of the xanthic acid. The radical designated x,x,x-trichlorobenzyl was derived from a trichlorobenzyl chloride prepared by chlorinating toluene in the ring in the presence of iron until the gain in weight corresponded to that calculated for trichloro-toluene and then removing the iron and chlorinating the side chain until the gain in weight corresponded to that calculated for trichlorobenzyl chloride. The latter prepared in this manner is a composite mixture of polychlorinated components in which the average constitution is that of trichlorobenzyl chloride.

The following examples describe the preparation of the new toxicants.

EXAMPLE 1

15.8 grams (0.386 mole) of 98% flaked sodium hydroxide was dissolved in 93.5 grams (2.03 moles) of ethyl alcohol and 29.5 grams (0.376 mole) of carbon bisulfide added gradually over a 15 minute period. 98 grams (0.327 mole) of pentachlorobenzyl chloride in 500 cc. of ethyl alcohol was then added all at once and the product stirred and heated to refluxing temperature. The light tan solid which formed changed to a liquid after heating for 2 hours at 68° C. Stirring was continued for 4 hours and the product allowed to stand overnight. Alcohol was removed by distillation under 25 mm. pressure and the pasty solid was dispersed in chloroform, the chloroform evaporated off in a steam oven and filtered through Attapulgus clay. The pentachlorobenzyl ethylxanthate was a clear brown liquid when hot but a sugary semi-liquid paste at 25° C. insoluble in water and ethyl alcohol, slightly soluble in ether, acetone, heptane and ethyl acetate and soluble in benzene and chloroform.

EXAMPLE 2

183 grams of sodium hydroxide was dissolved in 1185 grams of 80% isopropanol, cooled to 40° C. and with stirring, 355 grams of carbon bisulfide added slowly by means of a dropping funnel, maintaining the temperature at 40–50° C. Stirring was continued for about half an hour and 920 grams of x,x,x-trichlorobenzyl chloride added slowly, holding the temperature between 45–50° C. Stirring was continued until no more heat was liberated and the product then heated to refluxing temperature for 4 hours, cooled to 30° C. and washed with water. After filtration from Attapulgus clay, the x,x,x-trichlorobenzyl isopropylxanthate so obtained was a bright reddish amber liquid soluble in most organic solvents but insoluble in water.

Herbicidal activity is illustrated by application to the foliage of a mixture of grasses, to beans and to a mixture of broadleaf plants. An aqueous dispersion was applied as a spray and the effect on the plants recorded.

Table I

| Compound | Conc., percent | Phytotoxicity | | |
|---|---|---|---|---|
| | | Grasses | Bean | Mixture of Broadleaved plants |
| x,x,x-Trichlorobenzyl ethylxanthate. | 1.0 | moderate.. | severe...... | severe. |
| | 0.3 | slight...... | ---do....... | Do. |
| x,x,x-Trichlorobenzyl isopropylxanthate. | 0.2 | ---do....... | moderate... | slight. |
| Pentachlorobenzyl ethylxanthate. | 0.5 | ---do....... | ---do....... | moderate. |

In both the contact tests described above and pre-emergence tests at 25 pounds per acre, x,x,x-trichlorobenzyl ethylxanthate caused severe formative effects upon all broadleaf plants. Formative effects, although less severe, were observed with the other compounds.

It is intended to cover all changes and modifications of the examples of the invention herein chosen for purposes of disclosure which do not constitute departures from the spirit and scope of the invention.

What is claimed is:

1. The method of destroying vegetation which comprises applying thereto a lethal concentration of a phytotoxic halogen substituted aralkyl ester of a member of the group consisting of lower alkyl xanthic acids and allyl xanthic wherein the aralkyl radical is selected from a group consisting of halogen substituted benzyl and halogen substituted α-methylbenzyl.

2. The method of claim 1 in which the toxicant is applied to the ground before the plants emerge.

3. The method of destroying vegetation which comprises applying thereto a lethal concentration of a halogen substituted benzyl ester of a lower alkylxanthic acid.

4. The method of destroying vegetation which comprises applying thereto a lethal concentration of a 2,6-dichlorobenzyl ester of a lower alkylxanthic acid.

5. The method of destroying vegetation which comprises applying thereto a lethal concentration of a trichlorobenzyl ester of a lower alkylxanthic acid.

6. The method of destroying vegetation which comprises applying thereto a lethal concentration of a trichlorobenzyl ester of a propylxanthic acid.

7. The method of destroying vegetation which comprises applying thereto a lethal concentration of a trichlorobenzyl ester of allylxanthic acid.

8. The method of destroying vegetation which comprises applying thereto a lethal concentration of trichlorobenzyl ethylxanthate.

9. The method of destroying vegetation which comprises applying thereto a lethal concentration of 2,3,6-trichlorobenzyl lower alkylxanthate.

References Cited in the file of this patent

UNITED STATES PATENTS

| | | |
|---|---|---|
| 2,422,769 | Blake et al. | June 24, 1947 |
| 2,562,011 | Baumgartner | July 24, 1951 |
| 2,600,861 | Englund | June 17, 1952 |
| 2,846,298 | Osborn et al. | Aug. 5, 1958 |

OTHER REFERENCES

Ivanov et al.: "Chemical Abstracts," vol. 51, May-June 1957, col. 8906d.

Alhgren et al.: "Principles of Weed Control," John Wiley and Sons, Inc., N.Y., page 85.